(12) United States Patent
Rodriguez Bravo et al.

(10) Patent No.: US 12,511,368 B2
(45) Date of Patent: Dec. 30, 2025

(54) USER-FRIENDLY AND SELF-MANAGED CHALLENGE-RESPONSE AUTHENTICATION

(71) Applicant: Kyndryl, Inc., New York, NY (US)

(72) Inventors: Cesar Augusto Rodriguez Bravo, Alajuela (CR); John Richard Feezell, Pikeville, TN (US); Kim A. Eckert, Austin, TX (US); David Alonso Campos Batista, Aurora (CR)

(73) Assignee: Kyndryl, Inc., New York, NY (US)

( * ) Notice: Subject to any disclaimer, the term of this patent is extended or adjusted under 35 U.S.C. 154(b) by 100 days.

(21) Appl. No.: 18/406,286

(22) Filed: Jan. 8, 2024

(65) Prior Publication Data

US 2025/0225224 A1    Jul. 10, 2025

(51) Int. Cl.
*G06F 21/36* (2013.01)
*G06T 11/60* (2006.01)

(52) U.S. Cl.
CPC .............. *G06F 21/36* (2013.01); *G06T 11/60* (2013.01); *G06F 2221/2133* (2013.01)

(58) Field of Classification Search
CPC ............. G06F 21/36; G06F 2221/2133; G06F 2221/2103; G06T 11/60
See application file for complete search history.

(56) References Cited

U.S. PATENT DOCUMENTS

| | | | |
|---|---|---|---|
| 8,209,743 B1 * | 6/2012 | Frank | H04L 63/0838 726/28 |
| 8,904,493 B1 * | 12/2014 | Dibble | G06F 21/36 726/4 |
| 9,192,861 B2 | 11/2015 | Gross | |
| 9,600,678 B1 * | 3/2017 | Alamuri | G06F 21/36 |
| 10,007,776 B1 | 6/2018 | Bailey et al. | |
| 10,915,610 B2 | 2/2021 | Jadhav et al. | |
| 2008/0209223 A1 | 8/2008 | Nandy et al. | |

(Continued)

FOREIGN PATENT DOCUMENTS

CN    104618350 B    3/2018

OTHER PUBLICATIONS

Anonymous, "Capy Puzzle CAPTCHA solving service," URL: https://2captcha.com/p/capy_puzzle; Retrieved: Oct. 10, 2023; 5 pages.

(Continued)

*Primary Examiner* — Nam T Tran
(74) *Attorney, Agent, or Firm* — CANTOR COLBURN LLP; Erik Swanson

(57) ABSTRACT

Computer-implemented methods for a user-friendly and self-managed CAPTCHA system. Aspects include storing a copy of an image selected from a set of images as a source image. Aspects further include generating a reference image by applying an image obfuscation technique to the image and a challenge image by applying a different image obfuscation technique to the image. Aspects include dividing the challenge image into partitions and placing the partitions randomly on a virtual canvas. Aspects include displaying the reference image and the virtual canvas on a user device requesting to access a protected resource. Aspects include receiving a solution image comprising the partitions of the challenge image arranged by a user from the user device. Aspects also include generating a similarity score by comparing the source image and the solution image. Aspects further include determining that the similarity score is below a threshold value and performing a security action.

20 Claims, 11 Drawing Sheets

(56) References Cited

U.S. PATENT DOCUMENTS

| | | | | |
|---|---|---|---|---|
| 2009/0313694 | A1* | 12/2009 | Mates | G06F 21/36 |
| | | | | 382/209 |
| 2010/0262662 | A1* | 10/2010 | Wang | H04L 51/212 |
| | | | | 709/206 |
| 2012/0195517 | A1* | 8/2012 | Mittur | G06F 21/36 |
| | | | | 382/254 |
| 2012/0323700 | A1* | 12/2012 | Aleksandrovich | G06F 21/36 |
| | | | | 705/14.69 |
| 2014/0059663 | A1* | 2/2014 | Rajshekar | G06F 21/36 |
| | | | | 726/6 |
| 2017/0337373 | A1* | 11/2017 | Conti | G06F 21/55 |
| 2018/0189471 | A1* | 7/2018 | Paluri | G06F 21/36 |
| 2019/0303555 | A1* | 10/2019 | Agarwal | G06F 21/36 |
| 2020/0134159 | A1* | 4/2020 | Ford | G06F 21/36 |
| 2021/0387094 | A1 | 12/2021 | Young et al. | |

OTHER PUBLICATIONS

Anonymous, "Capy Puzzle CAPTCHA," URL: https://www.capy.me/products/puzzle_captcha/; Retrieved: Oct. 10, 2023; 1 page.

Anonymous, "Geetest-Slice-Captcha-Solver," URL: https://github.com/peduajo/geetest-slice-captcha-solver; Retrieved: Oct. 10, 2023; 2 pages.

Anonymous, "How to bypass slider captcha to solve puzzle using selenium?(Python)," URL: https://stackoverflow.com/questions/72825192/how-to-bypass-slider-captcha-to-solve-puzzle-using-seleniumpython; Retrieved: Oct. 10, 2023; 2 pages.

Anonymous, "Random Crop," URL: https://hasty.ai/docs/mp-wiki/augmentations/random-crop; Retrieved: Oct. 10, 2023; 3 pages.

D'souza et al., "Avatar CAPTCHA: Telling Computers and Humans Apart via Face Classification," IEEE International Conference on Electro/Information Technology, May 6-8, 2012, 6 pages.

D'souza, "Avatar Captcha : Telling Computers and Humans apart via Face Classification and Mouse Dynamics," Electronic Theses and Dissertations, Paper 1715, 2014, 116 pages.

Dzieza, "Why CAPTCHAs have gotten so difficult," The Verge, Feb. 1, 2019, 7 pages.

Korayem et al., "Solving Avatar Captchas Automatically," Advanced Machine Learning Technologies and Applications: First International Conference, Dec. 2012, 9 pages.

Nelson, "Why and How to Implement Random Crop Data Augmentation," Roboflow, Feb. 21, 2020, 7 pages.

Takahaski et al., "Data Augmentation using Random Image Cropping and Patching for Deep CNNs," Journal of Latex Class Files, vol. 14, No. 8, Aug. 2015, 16 pages.

Wickramasingha et al., "RotateCAPTCHA—A Novel Interactive CAPTCHA Design Targeting Mobile Devices," IEEE 10th International Conference on Industrial and Information Systems, Dec. 18-20, 2015, pp. 49-54.

* cited by examiner

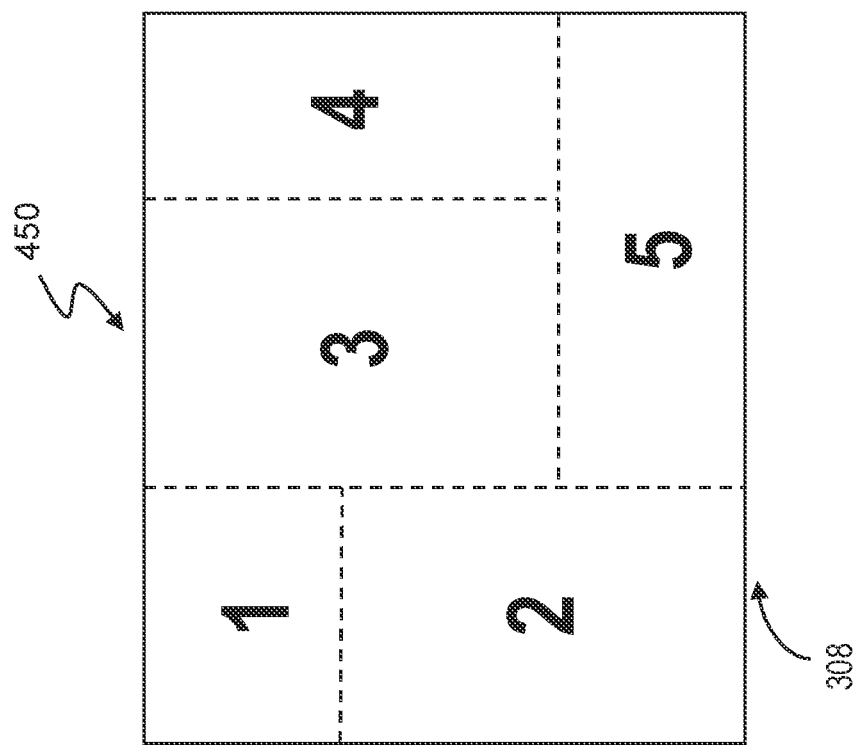
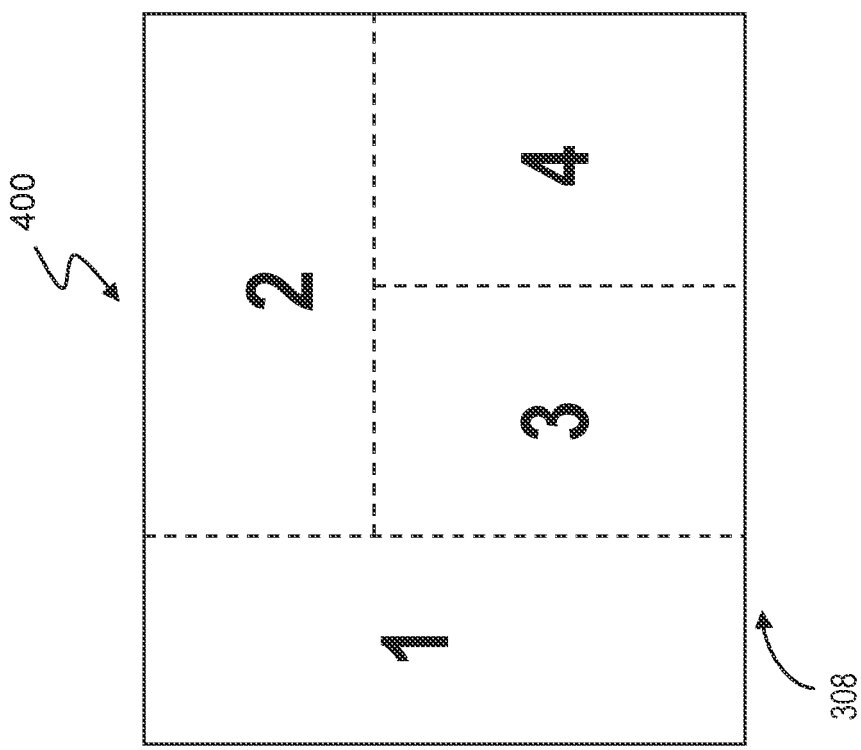
FIG. 4

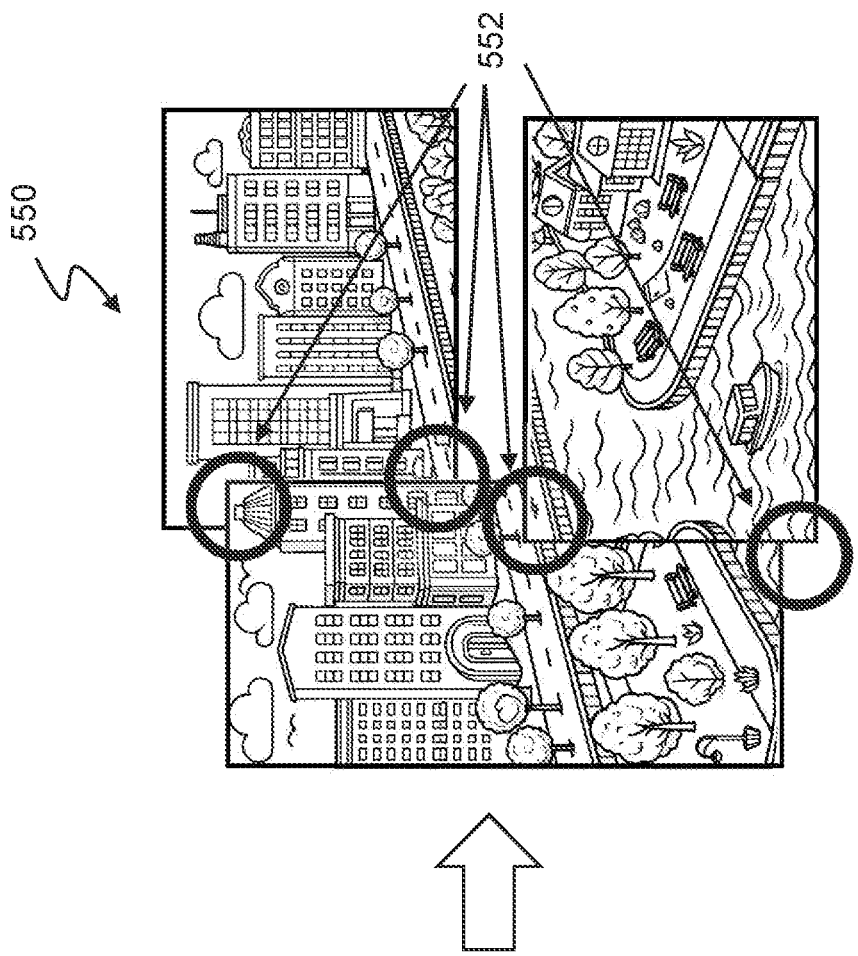
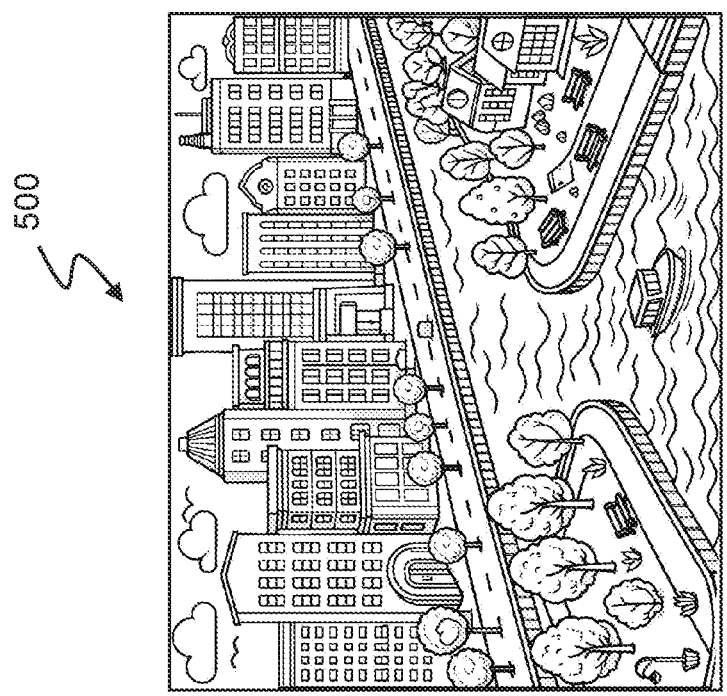
FIG. 5

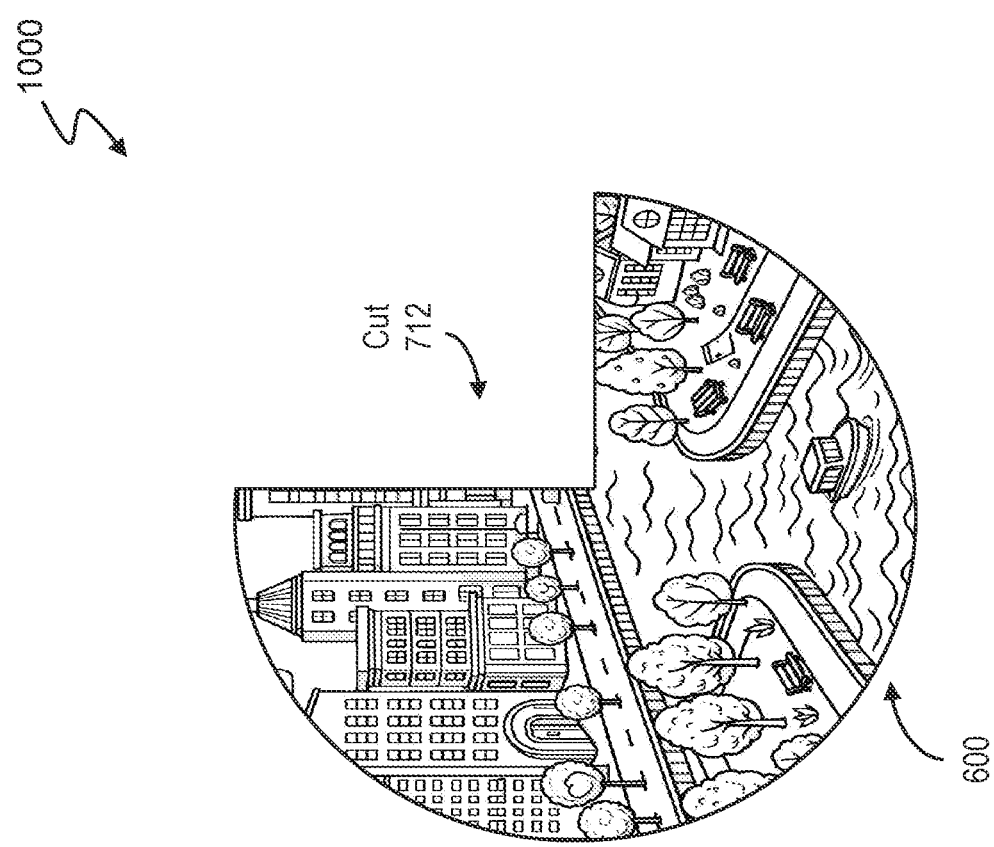

USER-FRIENDLY AND SELF-MANAGED CHALLENGE-RESPONSE AUTHENTICATION

BACKGROUND

The present invention generally relates to computer systems, and more specifically, to computer-implemented methods, computer systems, and computer program products configured and arranged to provide a user-friendly and self-managed challenge-response authentication system.

Bots, also known as crawlers or Internet bots, are software applications that execute scripts for automated and repetitive tasks. Malicious bots or malware bots perform activities that can create security risks and impact performance of a website or application. An example of malicious bots includes spambots that harvest email addresses from contact or guestbook pages. Website scrapers copy content from webpages and re-use the content without permission. Security risks imposed by malicious bots include Denial of Service attacks, unsolicited messages, fraudulent website traffic, registration spam, data scraping and the like. Many website and software applications utilize anti-bot measures, such as a challenge-response test, to deter malicious bot activity.

An example of a challenge-response test for authentication is Completely Automated Public Turing test to tell Computers and Humans Apart (CAPTCHA), which is a test designed to determine whether the user is a human by requiring the user to complete tasks that utilize sensory and cognitive skills that pose significant challenges for computer software to solve. For example, a modern text-based CAPTCHA can present a random assortment of characters or a word that has been visually distorted and requesting the user to identify the characters or words. The CAPTCHA may require that the user view an image, recognize characters despite variations in their shapes and sizes, separate the characters from each other, and identify each character.

SUMMARY

Embodiments of the present invention are directed to computer-implemented methods for a user-friendly and self-managed challenge-response authentication system. A non-limiting computer-implemented method includes storing a copy of an image selected from a set of images as a source image. The method also includes generating a reference image by applying an image obfuscation technique to the image and a challenge image by applying a different image obfuscation technique to the image. The method includes dividing the challenge image into a random number of partitions and placing the partitions randomly on a virtual canvas. The method further includes displaying the reference image and the virtual canvas with the partitions of the challenge image on a user device requesting to access a protected resource. The method includes receiving a solution image comprising the partitions of the challenge image arranged by a user from the user device. The method includes generating a similarity score by comparing the source image and the solution image. The method further includes determining that the similarity score is below a threshold value. The method includes performing a security action.

In one embodiment of the present invention, the image obfuscation technique includes reshaping the image, cropping the image, applying 3D rotation and effects on the image, or applying an image filter to the image.

In one embodiment of the present invention, the virtual canvas is larger than the challenge image.

In one embodiment of the present invention, the security action includes preventing access to the protected resource for the user device or presenting a second reference image and a second challenge image to the user of the user device.

In one embodiment of the present invention, the method includes receiving an indication to select the image from a sub-set of images, selecting the image from the sub-set of images, and updating metadata associated with the image to increase a counter indicating a number of times the image has been displayed.

In one embodiment of the present invention, the set of images comprises images associated with an identified metadata.

In one embodiment of the present invention, the method includes applying an overlay image obfuscation technique on the partitions of the challenge image in the virtual canvas.

According to another non-limiting embodiment of the invention, a system having a memory having computer readable instructions and one or more processors for executing the computer readable instructions, the computer readable instructions controlling the one or more processors to perform operations. The operations include storing a copy of an image selected from a set of images as a source image. The operations also include generating a reference image by applying an image obfuscation technique to the image and a challenge image by applying a different image obfuscation technique to the image. The operations include dividing the challenge image into a random number of partitions and placing the partitions randomly on a virtual canvas. The operations further include displaying the reference image and the virtual canvas with the partitions of the challenge image on a user device requesting to access a protected resource. The operations include receiving a solution image comprising the partitions of the challenge image arranged by a user from the user device. The operations include generating a similarity score by comparing the source image and the solution image. The operations further include determining that the similarity score is below a threshold value. The operations include performing a security action.

According to another non-limiting embodiment of the invention, a computer program product is provided. The computer program product includes a computer-readable storage medium having program instructions embodied therewith, the program instructions executable by a processor to cause the processor to perform operations. The operations include storing a copy of an image selected from a set of images as a source image. The operations also include generating a reference image by applying an image obfuscation technique to the image and a challenge image by applying a different image obfuscation technique to the image. The operations include dividing the challenge image into a random number of partitions and placing the partitions randomly on a virtual canvas. The operations further include displaying the reference image and the virtual canvas with the partitions of the challenge image on a user device requesting to access a protected resource. The operations include receiving a solution image comprising the partitions of the challenge image arranged by a user from the user device. The operations include generating a similarity score by comparing the source image and the solution image. The operations further include determining that the similarity score is below a threshold value. The operations include performing a security action.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 4 is a block diagram of an example virtual canvas for an example system for a user-friendly and self-managed challenge-response authentication system in accordance with one or more embodiments of the present invention;

FIGS. 5-10 are illustrative diagrams of obfuscation techniques used on images for a user-friendly and self-managed challenge-response authentication system in accordance with one or more embodiments of the present invention;

DETAILED DESCRIPTION

Figure 1:
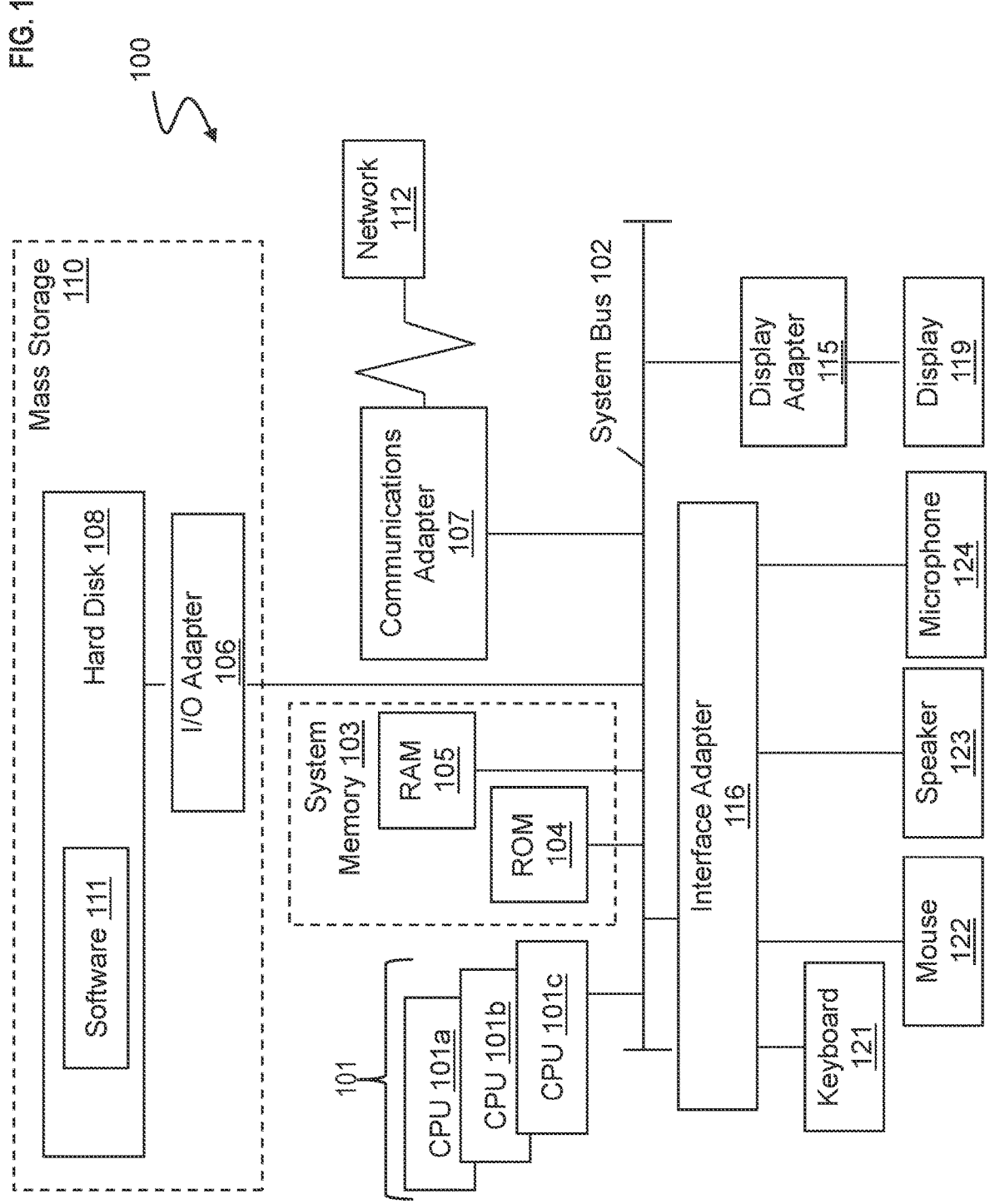
FIG. 1 is a block diagram of an example computer system for use in conjunction with one or more embodiments of the present invention.

Disclosed herein are methods, systems, and computer program products for a user-friendly and self-managed challenge-response authentication system. As discussed above, malicious bots perform activities that can create security risks and impact performance of a website or application, such as Denial of Service attacks, unsolicited messages, fraudulent website traffic, registration spam, data scraping and the like. Many website and software applications utilize anti-bot measures, such as a challenge-response test, to deter malicious bot activity. With the acceleration of public availability and sophistication of artificial intelligence systems, current challenge-response tests are vulnerable to bots that are capable of circumventing existing challenge-response authentication systems.

The systems and methods described herein are directed to a user-friendly and self-managed challenge-response authentication system, such as a CAPTCHA system, that is able to deter malicious bots while providing capabilities for direct administration and marketing monetization. The self-managed challenge-response authentication system is an automated system that enables an administrator of the system to add, change, and/or update the graphic resources or images used by the system to generate challenge-response tests to provide security validation for protected resources, such as content, applications, or the like.

In some embodiments, the system generates and/or updates the graphic resource, such as a database of images, by gathering images associated with identified metadata from a source, such as the Internet or a source designated by an administrator of the system. The system is also capable of receiving a set or pool of images provided by the system administrator. In some embodiments, the set or pool of images is provided by a sponsor or advertiser for use in the monetization of the system.

In some embodiments, the system receives a request from a user device to access a protected resource. To determine whether the request is from a human user or a malicious bot, the system generates a challenge-response test. If the user is able to successfully solve the challenge-response test presented by the system, the system grants the user device access to the protected resource. However, if the user is unable to solve the challenge-response test, the system performs a security action, such as banning/excluding the user device or generating a new challenge-response test for the user.

In some embodiments, the system creates the challenge-response test by selecting a random image from the graphic resource. The system uses the image to generate a reference image and a challenge image. The reference image is generated by randomly applying one or more obfuscation techniques to the randomly selected image. The challenge image is generated by randomly applying one or more obfuscation techniques. Examples of obfuscation techniques include, but are not limited to, image overlay, image reshaping, cropping, applying 3D effects, and/or image filters.

The system ensures that the obfuscation techniques applied to the reference image and the challenge image are different. For example, the system ensures that one or more different obfuscation techniques, a different number of obfuscation techniques, and/or different order of obfuscation techniques are applied to the images. The system then divides the challenge image into partitions and randomly places them in a virtual canvas where the partitions are able to be repositioned by a user. The system generates the challenge-response test that includes the reference image and the virtual canvas containing the partitions of the challenge image and presents it to the user. The user refers to the reference image and repositions the partitions of the challenge image to recreate the reference image in the virtual canvas and submits their solution. The system executes a comparison between the image on the virtual canvas submitted by the user with the original image. If the images match, the system validates the authentication and grants the user device access to the protected resource. If the system determines that the images do not match, the system performs a security action, that can include locking out the user, presenting another challenge-response test, or the like.

In some embodiments, the system enables monetization by allowing the system to be adjusted to randomly select images from a sub-set of images from the graphic resource, such as advertisement images provided by a sponsor or advertiser, if one or more criteria are met.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random-access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, a microphone 124, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, storage capability including the system memory 103 and the mass storage 110, input means such as the keyboard 121, the mouse 122, and the microphone 124, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
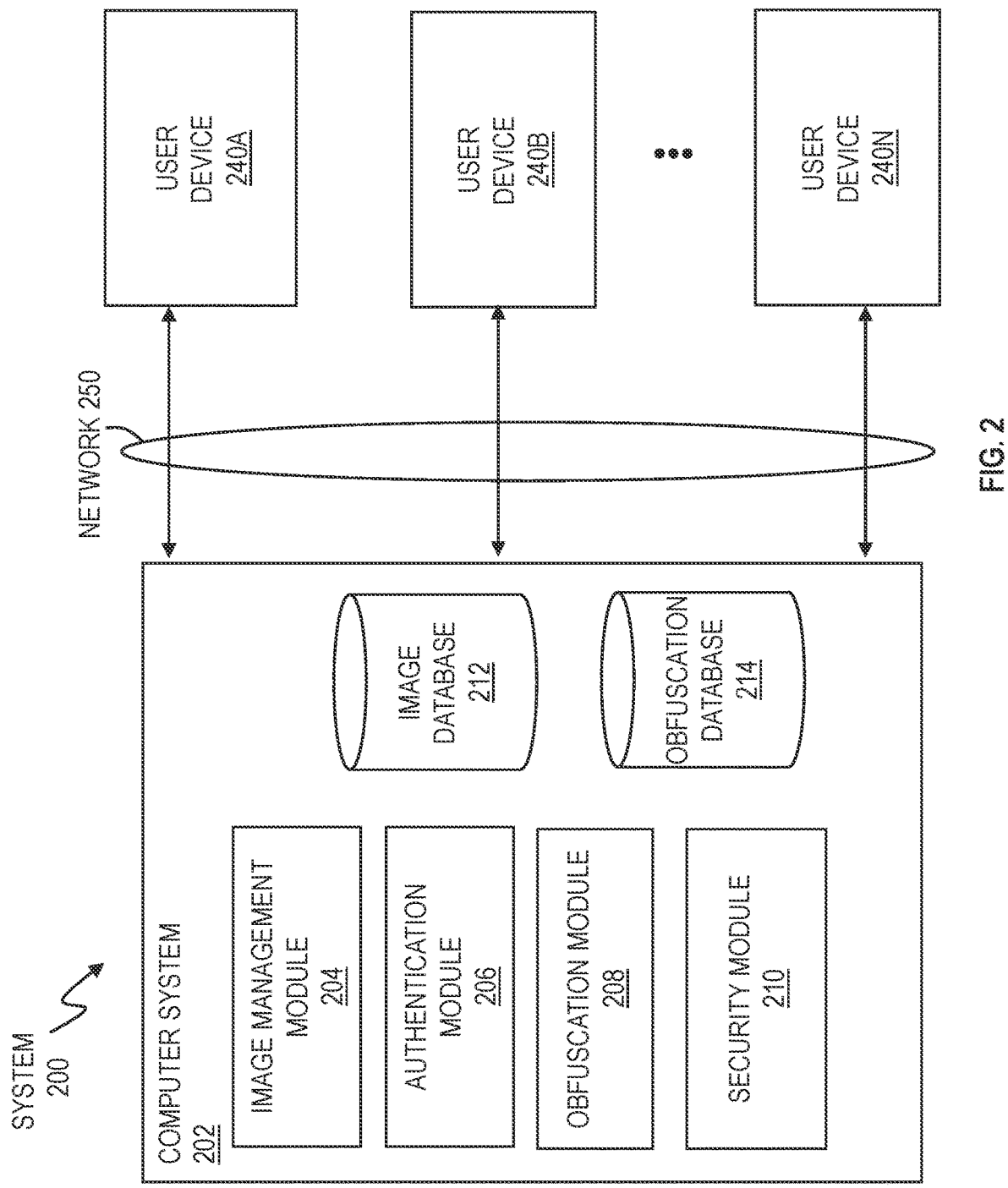
FIG. 2 is a block diagram of an example system for a user-friendly and self-managed challenge-response authentication system in accordance with one or more embodiments of the present invention.

FIG. 2 depicts a block diagram of an example system 200 configured for a user-friendly and self-managed challenge-response authentication system according to one or more embodiments. The system 200 includes a computer system 202 configured to communicate over a network 250 with many different user devices, such as user device 240A, user device 240B, through user device 240N. The user devices 240A, 240B, through 240N can generally be referred to as user device 240 and are utilized to access, for example, a protected resource. The user device 240 can be a personal computer or laptop. The user device 240 can be a mobile device such as a cellular phone or tablet, or a smart device. A smart device is an electronic device, generally connected to other devices or networks via different wireless protocols that can operate to some extent interactively. Several notable types of smart devices are smartphones, smart speakers, tablets, smartwatches, smart bands, smart glasses, and many others.

The network 250 can be a wired and/or wireless communication network, and the communication network includes a telecommunications network, the public switched telephone network (PTSN), voice over IP (VOIP) network, etc. The communication network includes cellular networks, satellite networks, etc.

The user devices 240 can include various software and hardware components including software applications (apps) for communicating with one another over the network 250 as understood by one of ordinary skill in the art. The computer system 202, user device(s) 240, image management module 204, authentication module 206, obfuscation module 208, security module 210, image database 212, and obfuscation database 214, etc., can include functionality and features of the computer system 100 in FIG. 1 including various hardware components and various software applications such as software 111 which can be executed as instructions on one or more processors 101 in order to perform actions according to one or more embodiments of the invention. The image management module 204, authentication module 206, obfuscation module 208, security module 210, image database 212, and obfuscation database 214 can include, be integrated with, and/or call other pieces of software, algorithms, application programming interfaces (APIs), etc., to operate as discussed herein.

The computer system 202 may be representative of numerous computer systems and/or distributed computer systems configured to provide security services to a user of the user device 240. The computer system 202 can be part of a cloud computing environment such as a cloud computing environment 50 depicted in FIG. 12, as discussed further herein.

In some embodiments, the computer system 202 can include one or more components to provide a user-friendly and self-managed challenge-response authentication system. For example, the computer system 202 can include an image management module 204, an authentication module 206, an obfuscation module 208, a security module 210, an image database 212, and an obfuscation database 214.

In some embodiments, image management module 204 gathers images to create an image database, such as image database 212. In some embodiments, the image management module 204 gathers images from a source that is identified by an administrator of the system. For example, the image management module 204 gathers images by scraping images from an identified set of webpages or other source. In some embodiments, the image management module 204 identifies images associated with an identified metadata, such as a tag or other information. For example, the image management module 204 receives indication of an identified metadata, such as the tag "city" and searches one or more identified sources for images associated with the tag "city." The image management module 204 adds the identified images to the image database 212. In some embodiments, the image management module 204 periodically adds images to the image database 212 and/or replaces images in the image database 212.

In some embodiments, the image management module 204 receives a sub-set of images from an administrator of the system. The sub-set of images are associated with unique metadata to distinguish the images from the other images in the image database 212. In some embodiments, the sub-set of images is a collection of advertisement images provided by a sponsor or advertiser and used for monetization of the system.

In some embodiments, the authentication module 206 receives the request to access protected resource and initiates the generation of a challenge-response test, such as a CAPTCHA. In some embodiments, the authentication module 206 randomly selects an image from the image database 212. The authentication module 206 stores a copy of the image and communicates with the obfuscation module 208.

The obfuscation module 208 receives the selected image from the authentication module 206. The obfuscation module 208 randomly selects one or more obfuscation techniques from the obfuscation database 214 and applies them to a copy of the selected image to generate a reference image. The obfuscation module 208 then randomly selects one or more obfuscation techniques from the obfuscation database 214 to a copy of the selected image to generate a challenge image. In some embodiments, the number of obfuscation techniques applied to the reference image and the challenge image are not the same. In some embodiments, the obfuscation techniques applied to the reference image and the challenge image are not the same. The obfuscation module 208 transmits the reference image and the challenge image to the authentication module 206.

The authentication module 206 receives the reference image and the challenge image from the obfuscation module 208 and generates the challenge-response test. The authentication module 206 divides the challenge image into a random number of partitions and places them in a virtual canvas. The partitions of the challenge image have move attributes in the virtual canvas that will allow the user to move each section around. The authentication module 206 includes the reference image and the virtual canvas containing the randomly placed partitions of the challenge image in the challenge-response test and transmits the challenge response test to the user device 240A.

The user device 240A receives and displays the challenge-response test to the user. The user views the reference image and moves the partitions of the challenge image in the virtual canvas to create an image. Once the user selects a SUBMIT button on the challenge-response test, a solution image will be generated based on the image on the virtual canvas. The authentication module 206 will compare the solution image and the source image previously stored by the authentication module 206. If there is a match, the authentication module 206 will flag the authentication as successful and provide access to the protected resource requested by the user device 240A. If there is not a match, the authentication module 206 will communicate with the security module 210, which will perform a security action. In some embodiments, the security action is locking out the user or presenting a second challenge-response test. In some embodiments, the security action is to ban/exclude the user device 240A or lockout the user device 240A for a predetermined amount of time (e.g., 10 minutes, 1 day, etc.) if the user device 240A fails the challenge-response test a predetermined number of times.

Figure 3:
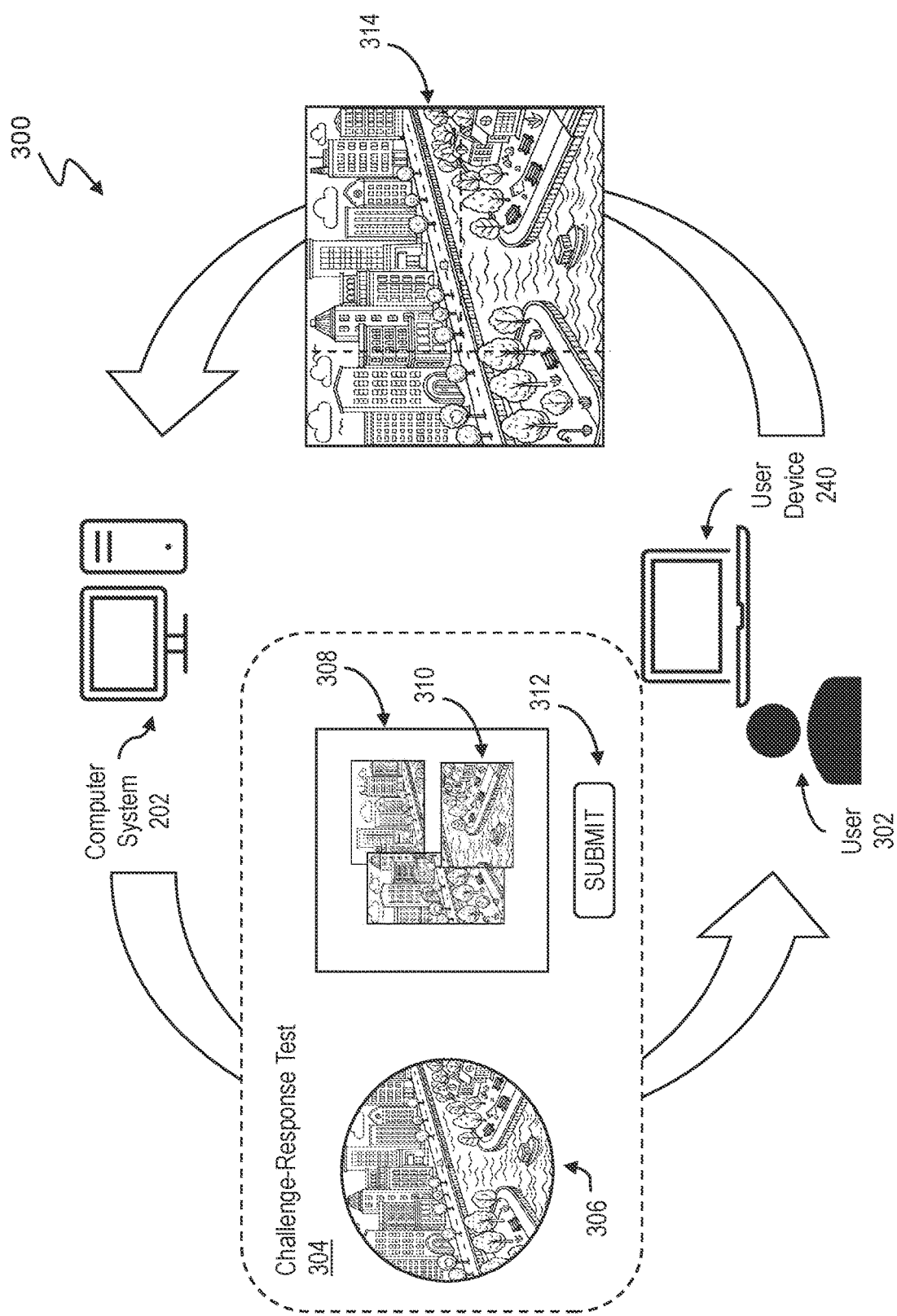
FIG. 3 is a data flow diagram for an example system for a user-friendly and self-managed challenge-response authentication system in accordance with one or more embodiments of the present invention.

FIG. 3 is a data flow diagram 300 for an example system for a user-friendly and self-managed challenge-response authentication system in accordance with one or more embodiments of the present invention. In some embodiments, a user 302 logs into a user device 240 and attempts to navigate a resource, such as content on a website. The computer system 202 receives the request to access the resource and initiates the challenge-response authentication, such as a CAPTCHA, to ensure that the user 302 is a human. In some embodiments, the computer system 202 presents a challenge-response test 304 to the user 302. The computer system 202 randomly selects an image and stores a copy of the image as a source image. The computer system 202 then randomly applies one or more obfuscation techniques to a copy of the image and generates a reference image 306. The computer system 202 then randomly applies one or more different obfuscation techniques to a copy of the image to generate a challenge image 310. The challenge image 310 is divided into a random number of partitions using a cropping algorithm. The partitions are randomly placed in a virtual canvas 308. The computer system 202 includes the reference image 306 and the virtual canvas 308 that displays the partitions of the challenge image 310 in the challenge-response test 304 and facilitates displaying the challenge-response test 304 to a user 302 of a user device 240.

The user 302 moves the partitions of the challenge image 310 around virtual canvas 308 to create an image that looks similar to the reference image 306. The user 302 selects the SUBMIT button 312 to indicate that they have finished the challenge-response test 304. A solution image 314 is generated from the partitions of the challenge image 310 configured by the user 302 in the virtual canvas 308. The computer system 202 receives the solution image 314 and compares it with the source image. If the images match, the user device 240 is granted access to the requested resource. If the images do not match, the computer system 202 performs a security action, such as locking out the user device 240 from accessing the resource or presenting another challenge-response test 304.

Now referring to FIG. 4, a block diagram of an example virtual canvas 308 for an example system for a user-friendly and self-managed challenge-response authentication system is depicted in accordance with one or more embodiments of the present invention. In some embodiments, the authentication module 206 of the computer system 202 generates a virtual canvas 308. In some embodiments, the virtual canvas 308 is an area of a challenge-response test 304 that acts as a container for the partitions of the challenge image 310 and is the designated area where the partitions of the challenge image 310 can be displayed as the user 302 adjusts the position of the partitions as they attempt to solve the challenge-response test 304. The authentication module 206 generates a virtual canvas 308 that is randomly divided into a different number of sections of varying sizes, as depicted in 400 and 450. By generating a virtual canvas 308 that is randomly divided into a different number of sections of varying sizes for each challenge-response test 304, the authentication module 206 enhances the entropy of the challenge-response authentication system, thereby increasing the difficulty level for automated bots. In some embodiments, the sections of the virtual canvas 308 correspond to the size and shape of the partitions of a challenge image 310 which results in a virtual canvas 308 that is the same size as the challenge image 310. In some embodiments, the virtual canvas 308 is larger than the challenge image 310.

Now referring to FIGS. 5-10, illustrative diagrams of obfuscation techniques used on images for a user-friendly and self-managed challenge-response authentication system are depicted in accordance with one or more embodiments of the present invention. One or more of the techniques described in relation to FIGS. 5-10 can be applied to an image to generate a reference image 306 and/or a challenge image 310.

In FIG. 5, an image, such as image 500, is transformed using an overlay obfuscation technique to generate image 550. In some embodiments, the obfuscation module 208, applies the overlay obfuscation technique to an image, such as image 500, to place sections of an image with a degree of overlay 552 between the image sections to prevent or fool image identification algorithms. For example, obfuscation module 208 receives image 500 and divides the image into partitions. In some embodiments, the partitions are different sizes. The obfuscation module 208 then randomly places the partitions of the image 500 on a virtual canvas 308 with a degree of overlay 552 over a preceding partition. In some embodiments, the degree of overlay 552 is randomly selected from a predetermined range to further enhance the entropy of the system.

Figure 6:
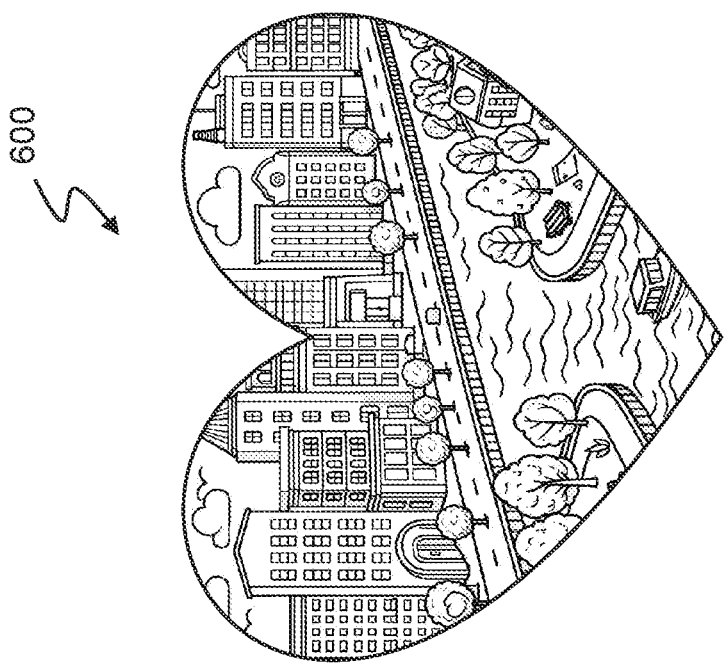

In FIG. 6, an image, such as image 500, is transformed using a reshape obfuscation technique to generate image 600. In some embodiments, the obfuscation module 208 applies the reshape obfuscation technique to an image, such as image 500, to adjust, crop, and shape the image using a plurality of random forms, such as the heart-shape depicted in FIG. 6. Reshaping the original image makes it more difficult for AI-based systems to recognize the entire image.

Figure 7:
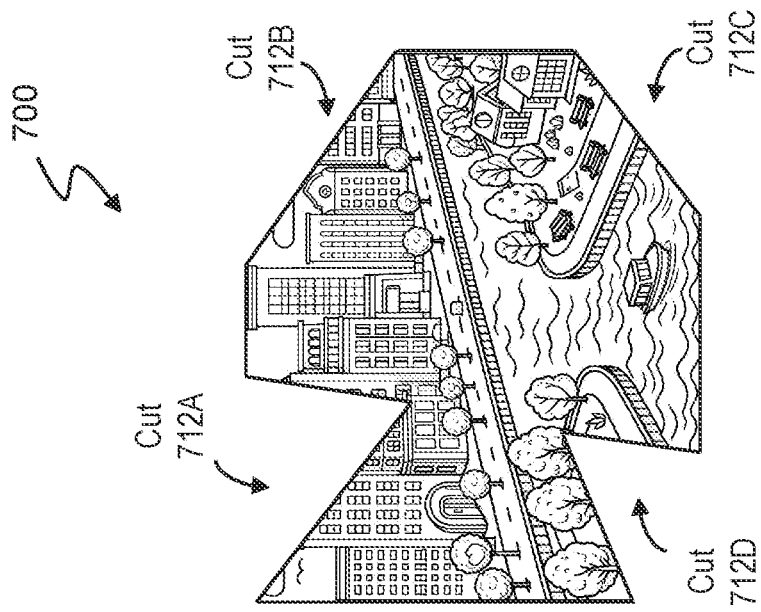

FIG. 7 is an example depiction of an image 700 generated by applying a cropping obfuscation technique to an original image, such as image 500. In some embodiments, the obfuscation module 208 will make cuts, such as cuts 712A, 712B, 712C, and 712D (generally referred to as 712), to an image by cropping randomly sized and shaped sections out of the original image 500. In some embodiments, the obfuscation module 208 determines a random number of cuts 712 to make to an image.

Figure 8:
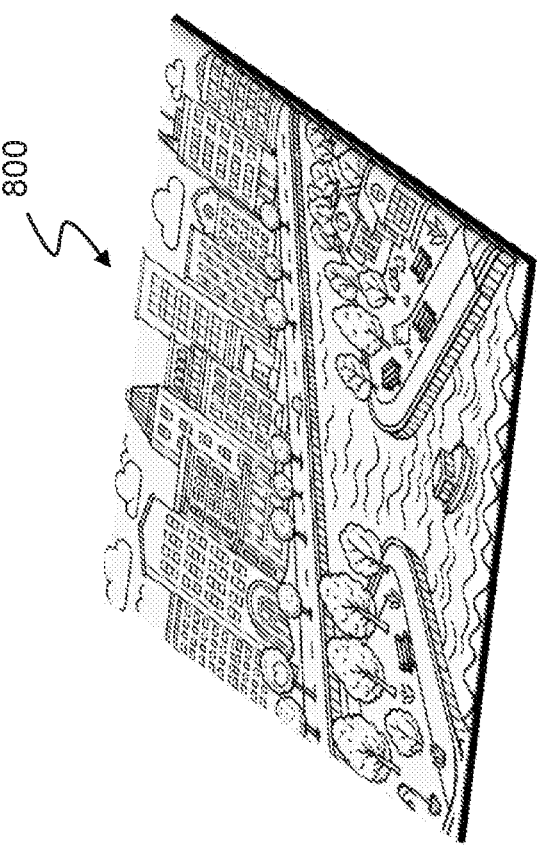

In FIG. 8, an image, such as image 500, is transformed by applying one or more 3D effects obfuscation technique to generate image 800. In some embodiments, the obfuscation module 208 uses one or more techniques, such as image rotation and offset duplicative layers, to alter the image 500 so that it appears to have depth.

Figure 9:
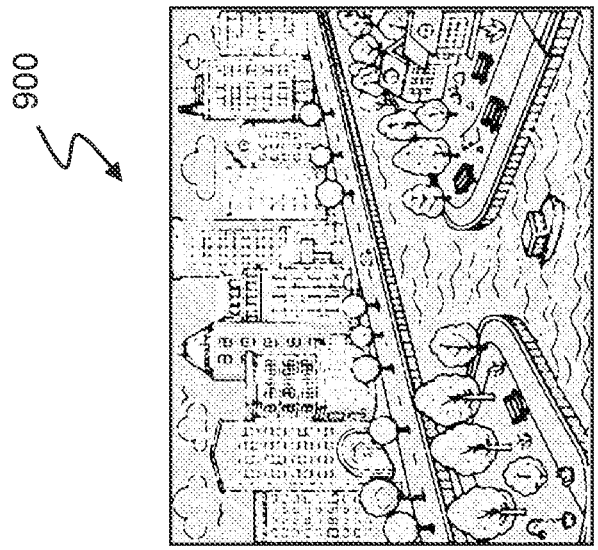

In another example obfuscation technique, as depicted in FIG. 9, an image, such as image 500, is transformed using one or more filter obfuscation techniques to generate image 900. In some embodiments, the obfuscation module 208 applies image filters, such as shading, outline, color transformations, and the like, to alter an image.

FIG. 10 is an example depiction of an image 1000 that is generated by applying multiple obfuscation techniques to an original image, such as image 500. For example, the obfuscation module 208 applied a reshaping obfuscation technique that transformed the original image 500 into a reshaped image 600 (e.g., a circle) and a cropping obfuscation technique to make a cut 712 to the reshaped image 600.

Figure 11:
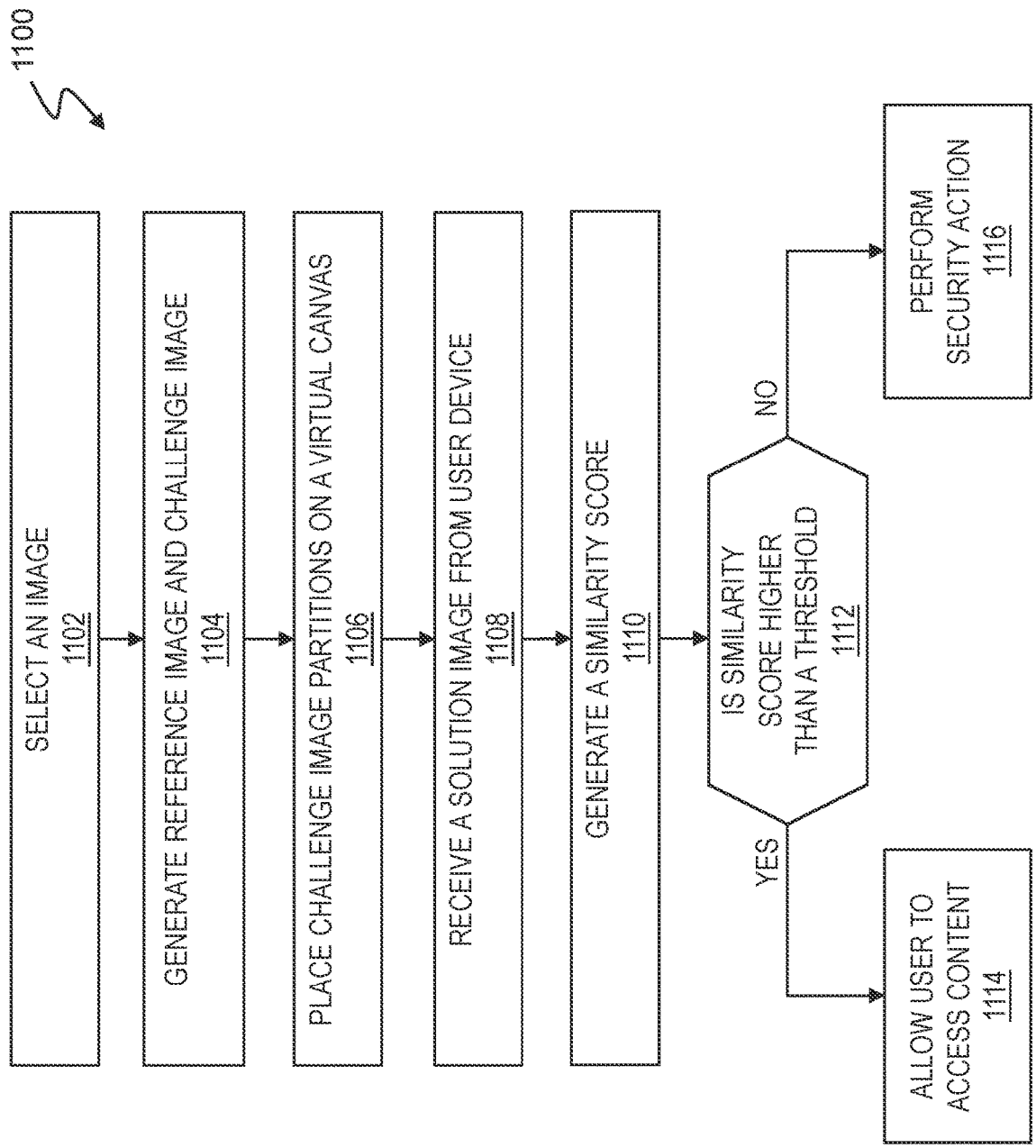
FIG. 11 is a flowchart of a computer-implemented method for a user-friendly and self-managed challenge-response authentication system in accordance with one or more embodiments of the present invention.

Now referring to FIG. 11, a flowchart of a computer-implemented method 1100 for a user-friendly and self-managed challenge-response authentication system is depicted. The method 1100 begins at block 1102 by selecting an image. As discussed above, the authentication module 206 of the computer system 202 receives a request to access a protected resource from a user device 240. In some embodiments, the authentication module 206 receives the request and initiates generation of a challenge-response test 304. The authentication module 206 communicates with the image management module 204 of the computer system 202 to request an image to use to generate the challenge-response test 304. In some embodiments, the image management module 204 selects a random image from an image database 212. In some embodiments, the image management module 204 selects a random image from a set of images associated with an identified metadata. For example, in response to receiving the request from the authentication module 206, the image management module 204 uses one or more metadata associated with the request, such as a keyword, geographic area, or the like to identify images associated with the identified metadata. The image management module 204 selects a random image from the group of images associated with the identified metadata.

In some embodiments, the image management module 204 determines that the request from the authentication module 206 requires an image from a sub-set of images within the image database 212. In one example, the sub-set of images is a pool of images provided by a vendor or advertiser and the pool of images includes advertisement images. Based on one or more criteria provided by the vendor or advertiser and/or an administrator of the computer system 202, the image management module 204 selects a random image from the designated sub-set of images. Examples of criteria used to determine whether to select the image from the sub-set of images include, but are not limited to, geographic area associated with the request to access a protected resource (e.g., IP address of the user device 240), type of user device 240, type of content associated with the request to access the protected resource (e.g., hotel reservations, event tickets, etc.). In some embodiments, the image management module 204 uses one or more criteria to search for metadata associated with one or more sub-sets of images. In some embodiments, the image management module 204 selects a sub-set of images and randomly selects an image from the identified sub-set. In some examples, the image management module 204 updates metadata associated with the image selected from the identified sub-set of images to indicate selection of the image. The metadata associated with the image can be a counter indicating a number of times the image has been displayed. The image management module 204 can update additional metadata associated with the image or the sub-set of images from which the image was selected, which may be used in tracking how and when the images of the sub-set of images is being used by the computer system 202.

The image management module 204 transmits the randomly selected image to the authentication module 206.

Next at block 1104, the method 1100 includes generating a reference image 306 and a challenge image 310. In some embodiments, the authentication module 206 receives the selected image and stores a copy of the image as a source image. The source image is a copy of the selected image without any type of modification. The source image is stored by the authentication module 206 in a data structure associated with the request to access the protected resource from the user device 240. In some embodiments, the data structure is used to track information associated with the request to access the protected resource from the user device 240, such as the obfuscation techniques and used to generate the challenge image 310, the number of challenge-response tests 304 generated in response to the request (e.g., if the system determines the user did not pass the challenge-response test, another challenge-response test is generated and presented to the user), and the like. In some embodiments, the data structure is deleted upon completion of the response to the request for access (e.g., providing accessing to the protected resource upon passing the challenge-response test 304, blocking access to the protected resource upon failing the challenge-response test, etc.).

The method 1100 further includes generating a reference image 306 and a challenge image 310 for the challenge-response test 304. In some embodiments, the authentication module 206 transmits the image selected by the image management module 204 to the obfuscation module 208. The obfuscation module 208 generates the reference image 306 by applying one or more obfuscation techniques to the selected image. In some embodiments, the obfuscation techniques are obtained from the obfuscation database 214. The obfuscation module 208 randomly selects one or more obfuscation techniques and applies them to the selected image. The obfuscation techniques can include, but are not limited to, the obfuscation techniques discussed in FIGS. 5-10, such as reshaping the image, cropping the image, applying 3D rotation and effects on the image, and/or applying an image filter to the image.

Similarly, the obfuscation module 208 generates the challenge image 310 by applying by applying one or more obfuscation techniques to the image. In some embodiments. The obfuscation module 208 randomly selects one or more obfuscation techniques and applies them to the selected image. In some embodiments, the obfuscation module 208 applies a different number of obfuscation techniques to the reference image 306 and the challenge image 310. In some embodiments, the obfuscation module 208 applies different obfuscation techniques to generate the reference image 306 and the challenge image 310. The obfuscation transmits the reference image 306 and the challenge image 310 to the authentication module 206. In some embodiments, the obfuscation module 208 also transmits identifiers associated with the obfuscation techniques used to generate the reference image 306 and the challenge image 310. In some embodiments, the obfuscation module 208 transmits the order in which the obfuscation techniques were applied to the image to generate the reference image 306 and the challenge image 310.

Next at block 1106, the method 1100 includes placing partitions of the challenge image 310 on a virtual canvas 308. The authentication module 206 receives the reference image 306 and the challenge image 310 from the obfuscation module 208. In some embodiments, the authentication module 206 receives additional information associated with the reference image 306 and/or the challenge image 310 from the obfuscation module 208, such as identifiers associated with the obfuscation techniques used in the generation of the images, the order the obfuscation techniques were applied to the selected image in the generation of the images, and the like. The authentication module 206 stores the additional information in the data structure associated with the request for access with the source image previously stored in the data structure.

In some embodiments, the authentication module 206 generates a virtual canvas 308. In one example, the authentication module 206 divides the virtual canvas 308 into sections. The sections of the virtual canvas 308 can be the same size and shape or can be varying sizes and shapes, as depicted in FIG. 4. In some embodiments, the authentication module 206 divides the challenge image 310 into partitions. The partitions of the challenge image 310 can be the same size and shape or can be varying shapes and sizes. The authentication module 206 randomly places the partitions of the challenge image 310 in random sections of the virtual canvas 308. In some embodiments, the size of the virtual canvas 308 is the same as the challenge image 310. In other embodiments, the size of the virtual canvas 308 is larger than the challenge image 310. The partitions of the challenge image 310 have move attributes in the virtual canvas 308 that enable the user to move the partitions in the virtual canvas 308 to solve the challenge-response test 304.

The authentication module 206 generates the challenge-response test 304 to include the reference image 306, the virtual canvas 308, and the randomly placed partitions of the challenge image 310 in the virtual canvas 308. The challenge-response test 304 includes a SUBMIT button 312 for the user to select when they have completed moving the partitions of the challenge image 310 in the virtual canvas 308.

The authentication module 206 facilitates presentation of the challenge-response test 304 on a user device 240. In some embodiments, the challenge-response test 304 facilitates displaying instructions for solving the test. In some embodiments, the challenge-response test 304 includes a button to request generation of a new challenge-response test 304. In response to the user selecting the button to request a new challenge-response test 304, the authentication module 206 generates a new challenge-response test 304 using a different image and facilitates presentation of the newly generated challenge-response test 304 on the user device 240.

At block 1108, the method 1100 further includes receiving a solution image 314 from the user device 240. The user 302 solves the challenge-response test 304 using the user device 240 by viewing the reference image 306 and moving the partitions of the challenge image 310 in the virtual canvas 308 to recreate the reference image 306. When the user 302 has finished moving the partitions of the challenge image 310, the user selects the SUBMIT button 312 of the challenge-response test 304. In response to the selection of the SUBMIT button 312, the solution image 314 is generated by capturing the partitions of the challenge image 310 positioned by the user 302 in the virtual canvas 308.

Next at block 1110, the method 1100 includes generating a similarity score. In some embodiments, the authentication module 206 uses the solution image 314 received from the user device 240 and the previously stored source image to generate a similarity score to determine if the images match and the user has successfully solved the challenge-response test 304. In some embodiments, the authentication module 206 uses any known comparison algorithm that generates a score indicative of a level of similarity between the solution image 314 and the source image. In some embodiments, the authentication module 206 uses an algorithm that positions the solution image 314 over the source image and calculates a similarity score indicative of a level of similarity between the images. In some embodiments, the authentication module 206 uses information stored in the data structure to reverse the obfuscation techniques that were used in the generation of the challenge image 310. For example, the authentication module 206 can apply obfuscation techniques that correspond to the identified obfuscation techniques to reverse their application in the reverse order designated in the stored data. The authentication module 206 can then use any known algorithm to score the processed solution image 314 and the source image to generate a similarity score.

At block 1112, the method 1100 further includes determining if the similarity score is higher than a threshold value. In some embodiments, the threshold value is a value provided by an administrator of the computer system 202. The threshold value is a value that can be adjusted to meet the different needs of different users of the system. For example, if the requested resource of the computer system 202 is associated with high security and confidentiality needs, such as a financial institution, the threshold value is set to a higher value. If the request resource is associated with a moderate security needs, such as access to a periodical or digital content, the threshold value is set to a lower value.

The method 1100 further includes comparing the similarity score with the threshold value. If the authentication module 206 compares the similarity score with the threshold value and determines that the similarity score is equal to or higher than the threshold value, the method proceeds to block 1114 and the user device 240 is granted access to the requested resource. If the authentication module 206 compares the similarity score with the threshold value and determines that the similarity score is lower than the threshold value, the method proceeds to block 1116.

At block 1116, the method 1100 further includes performing a security action. A security action is one or more action taken by the computer system 202 to protect the requested resource from possible malicious bots. In one example, the security action includes banning/excluding the user 302 and/or the user device 240 from accessing the requested resource. In some embodiments, the security action is presenting the user with a challenge-response test 304 generated using a different random image. In some embodiments, the authentication module 206 permits a predetermined number of challenge-response tests 304 to be generated and presented to the user 302 on the user device 240 before taking further action, such as banning/excluding the user 302 and/or the user device 240 or locking out the user 302 and/or user device 240 from accessing the requested resource for a predetermined period of time or locking out the user 302 and/or user device 240 from attempting another challenge-response test 304.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
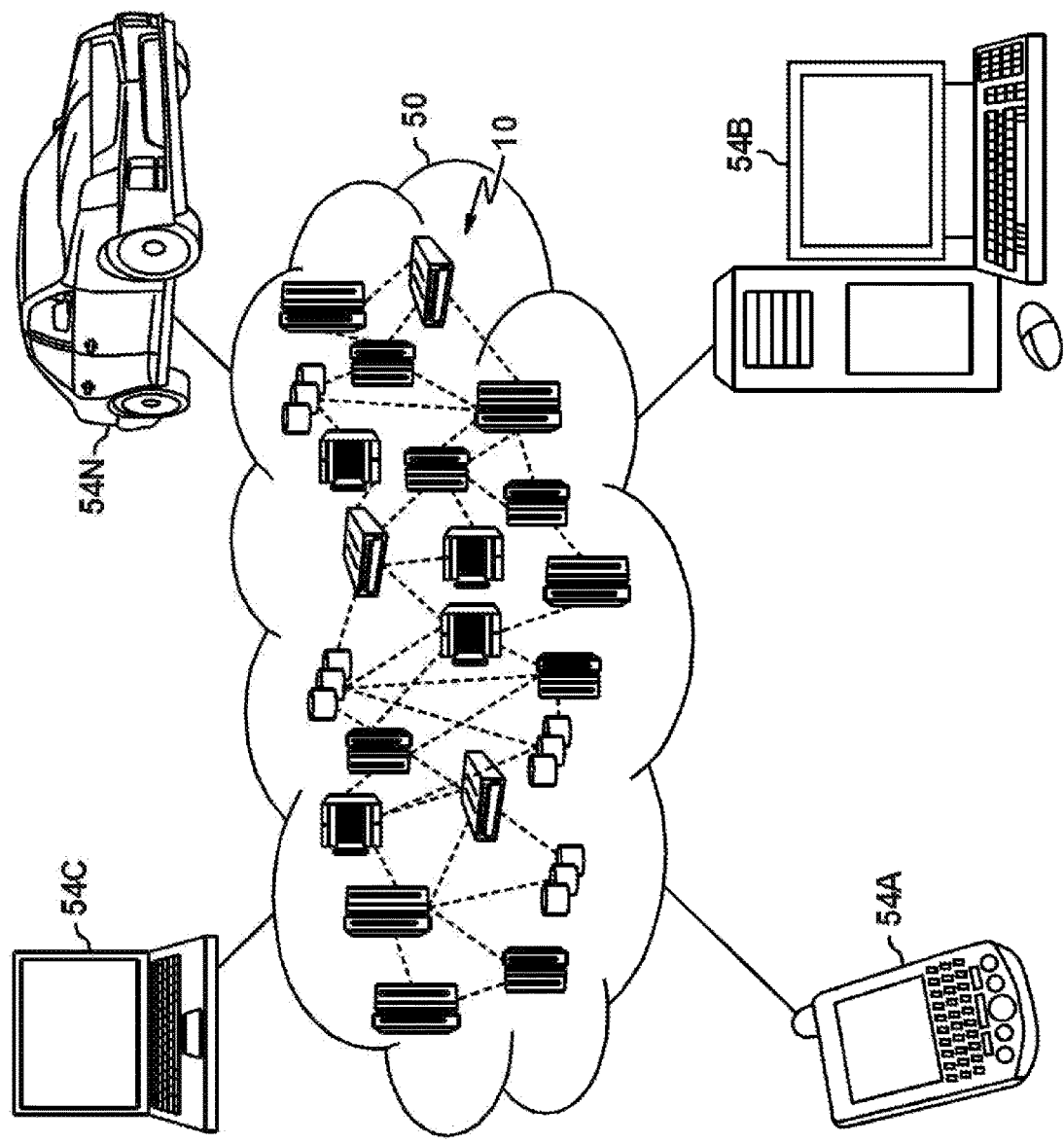
FIG. 12 depicts a cloud computing environment in accordance with one or more embodiments of the present invention.

Referring now to FIG. 12, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection (e.g., using a web browser).

Figure 13:
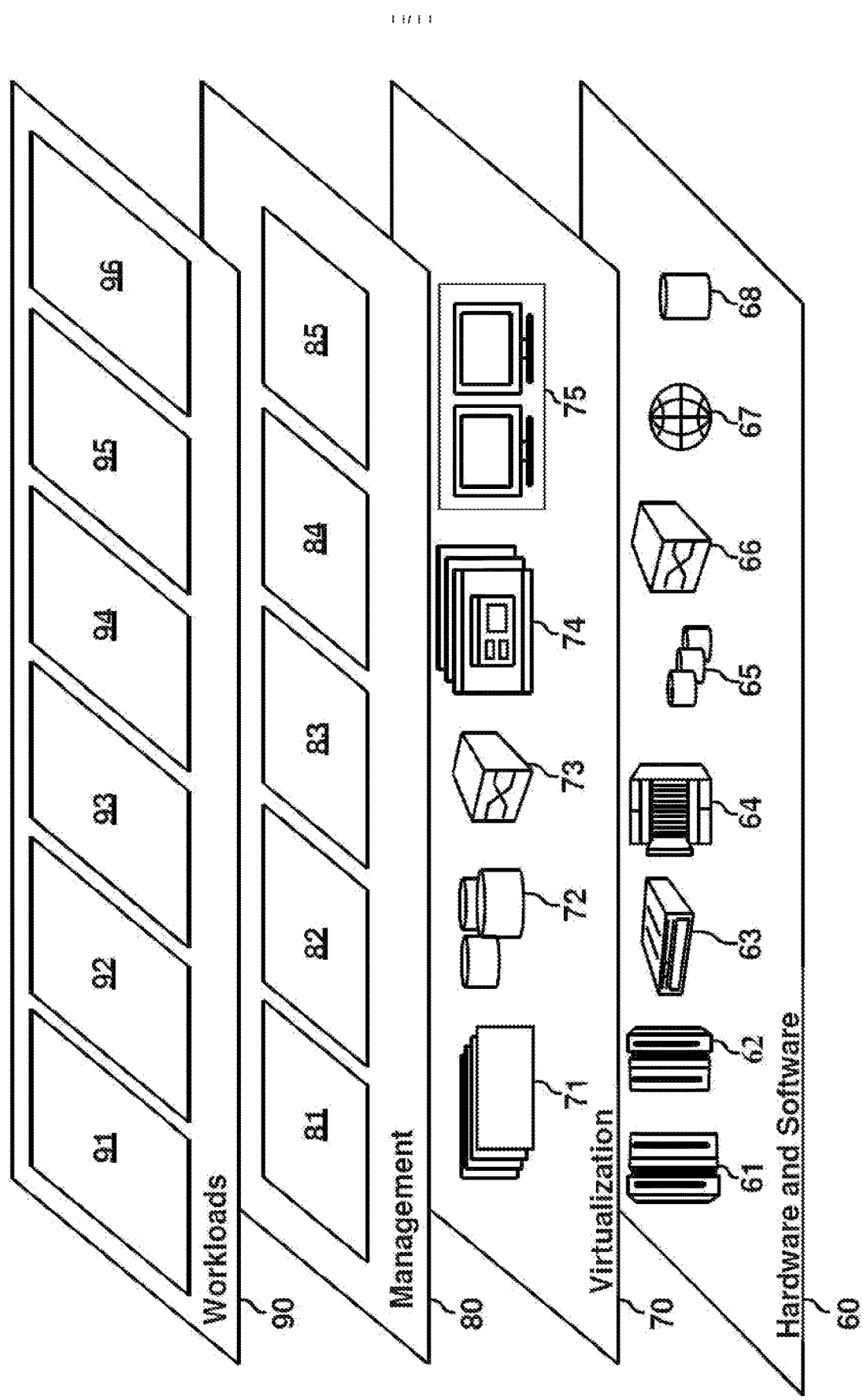
FIG. 13 depicts abstraction model layers in accordance with one or more embodiments of the present invention.

Referring now to FIG. 13, a set of functional abstraction layers provided by cloud computing environment 50 (depicted in FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workloads and functions 96.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted, or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of +8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   storing a copy of an image selected from a set of images as a source image;
   generating a reference image by applying an image obfuscation technique to the image and a challenge image by applying a different image obfuscation technique to the image;
   dividing the challenge image into a random number of partitions and placing the partitions randomly on a virtual canvas;
   displaying both the reference image and the virtual canvas with the partitions of the challenge image on a user device requesting to access a protected resource, such that both the reference image and the challenge image are concurrently visible on the user device to a user, wherein both the reference image and the challenge image are concurrently displayed to be different from the image;
   receiving a solution image comprising the partitions of the challenge image arranged by the user from the user device;
   generating a similarity score by comparing the source image and the solution image;
   determining that the similarity score is below a threshold value; and
   performing a security action.

2. The computer-implemented method of claim 1, wherein the image obfuscation technique comprises reshaping the image, or cropping the image to carve out one or more portions.

3. The computer-implemented method of claim 1, wherein the virtual canvas is larger than the challenge image.

4. The computer-implemented method of claim 1, wherein the security action comprises preventing access to the protected resource for the user device or presenting a second reference image and a second challenge image to the user of the user device.

5. The computer-implemented method of claim 1, further comprising:
   receiving an indication to select the image from a sub-set of images;
   selecting the image from the sub-set of images; and
   updating metadata associated with the image to increase a counter indicating a number of times the image has been displayed.

6. The computer-implemented method of claim 1, wherein the set of images comprises images associated with an identified metadata.

7. The computer-implemented method of claim 1, further comprising:
   applying an overlay image obfuscation technique on the partitions of the challenge image in the virtual canvas.

8. A system comprising:
   a memory having computer readable instructions; and
   one or more processors for executing the computer readable instructions, the computer readable instructions controlling the one or more processors to perform operations comprising:
      storing a copy of an image selected from a set of images as a source image;
      generating a reference image by applying an image obfuscation technique to the image and a challenge image by applying a different image obfuscation technique to the image;
      dividing the challenge image into a random number of partitions and placing the partitions randomly on a virtual canvas;
      displaying both the reference image and the virtual canvas with the partitions of the challenge image on a user device requesting to access a protected resource, such that both the reference image and the challenge image are concurrently visible on the user device to a user, wherein both the reference image and the challenge image are concurrently displayed to be different from the image;
      receiving a solution image comprising the partitions of the challenge image arranged by the user from the user device;
      generating a similarity score by comparing the source image and the solution image;
      determining that the similarity score is below a threshold value; and
      performing a security action.

9. The system of claim 8, wherein the image obfuscation technique comprises reshaping the image, cropping the image, applying 3D rotation and effects on the image, or applying an image filter to the image.

10. The system of claim 8, wherein the virtual canvas is larger than the challenge image.

11. The system of claim 8, wherein the security action comprises preventing access to the protected resource for the user device or presenting a second reference image and a second challenge image to the user of the user device.

12. The system of claim 8, wherein the operations further comprise:
    receiving an indication to select the image from a sub-set of images;
    selecting the image from the sub-set of images; and
    updating metadata associated with the image to increase a counter indicating a number of times the image has been displayed.

13. The system of claim 8, wherein the set of images comprises images associated with an identified metadata.

14. The system of claim 8, wherein the operations further comprise:
    applying an overlay image obfuscation technique on the partitions of the challenge image in the virtual canvas.

15. A computer program product comprising a computer readable storage medium having program instructions embodied therewith, the program instructions executable by one or more processors to cause the one or more processors to perform operations comprising:
    storing a copy of an image selected from a set of images as a source image;

generating a reference image by applying an image obfuscation technique to the image and a challenge image by applying a different image obfuscation technique to the image;
dividing the challenge image into a random number of partitions and placing the partitions randomly on a virtual canvas;
displaying both the reference image and the virtual canvas with the partitions of the challenge image on a user device requesting to access a protected resource, such that both the reference image and the challenge image are concurrently visible on the user device to a user, wherein both the reference image and the challenge image are concurrently displayed to be different from the image;
receiving a solution image comprising the partitions of the challenge image arranged by the user from the user device;
generating a similarity score by comparing the source image and the solution image;
determining that the similarity score is below a threshold value; and
performing a security action.

16. The computer program product of claim 15, wherein the image obfuscation technique comprises reshaping the image, cropping the image, applying 3D rotation and effects on the image, or applying an image filter to the image.

17. The computer program product of claim 15, wherein the virtual canvas is larger than the challenge image.

18. The computer program product of claim 15, wherein the security action comprises preventing access to the protected resource for the user device or presenting a second reference image and a second challenge image to the user of the user device.

19. The computer program product of claim 15, wherein the operations further comprise:
receiving an indication to select the image from a sub-set of images;
selecting the image from the sub-set of images; and
updating metadata associated with the image to increase a counter indicating a number of times the image has been displayed.

20. The computer program product of claim 15, wherein the set of images comprises images associated with an identified metadata.

* * * * *